United States Patent [19]
Reiff et al.

[11] 3,959,348
[45] May 25, 1976

[54] LIQUID ORGANIC POLYISOCYANATES CONTAINING CARBOXYL AND/OR CARBOXYLATE GROUPS

[75] Inventors: Helmut Reiff, New Martinsville, W. Va.; Peter Markusch, Cologne; Dieter Dieterich, Leverkusen, both of Germany

[73] Assignee: Bayer Aktiengesellschaft, Leverkusen, Germany

[22] Filed: Nov. 26, 1974

[21] Appl. No.: 527,389

[30] Foreign Application Priority Data
Nov. 30, 1973 Germany............................ 2359613

[52] U.S. Cl...................... 260/471 C; 260/2.5 AT; 260/77.5 AT; 260/404.5; 260/453 AR; 260/455 A
[51] Int. Cl.² ............. C07C 119/048; C07C 155/02
[58] Field of Search ..... 260/471 C, 455 A, 453 AR, 260/455 A, 404.5

[56] References Cited
UNITED STATES PATENTS
3,412,054   11/1968   Milligan et al................. 260/77.5 A

*Primary Examiner*—Lewis Gotts
*Assistant Examiner*—Dolph H. Torrence
*Attorney, Agent, or Firm*—Joseph C. Gil; Gene Harsh

[57] ABSTRACT

Liquid organic polyisocyanates containing carboxyl and/or carboxylate groups are prepared by reacting liquid multicomponent mixtures of aromatic polyisocyanates having an isocyanato content of about 10 to about 20% by weight and a viscosity of about 8 cP to about 10,000 cP at 25°C with a. a compound which contains carboxylate groups and hydrogen atoms which are reactive with isocyanate groups; or
b. a hydroxycarboxylic or mercaptocarboxylic acid, whereby
 ba. at least partial conversion of the carboxyl group into the corresponding carboxylate group by neutralization with a base is carried out simultaneously with or after the isocyanate addition reaction or
 bb. the hydroxycarboxylic acid or mercaptocarboxylic acid is of the kind in which the carboxyl groups are much less reactive with the isocyanate groups than are the hydroxyl or mercapto groups, the quantitative proportion of the reactants being so chosen that the products of the process have an isocyanate content of 10 to 40% by weight and a carboxyl or carboxylate group content of 0.1 to 10% by weight. The polyisocyanates can be used to make inorganic-organic plastics.

4 Claims, No Drawings

LIQUID ORGANIC POLYISOCYANATES CONTAINING CARBOXYL AND/OR CARBOXYLATE GROUPS

This invention relates to organic polyisocyanates and more particularly to liquid aromatic polyisocyanates containing carboxyl groups and a process for making them.

Organic diisocyanates which contain carboxyl groups are already known (U.S. Pat. No. 3,412,054). For example, a 50% solution of an addition product containing both isocyanate and carboxyl groups can be prepared from dimethylol-propionic acid (1 mol) and tolylene diisocyanate (2 mol) in highly polar solvents such as ethylene glycol-monoethylether acetate. This reaction is restricted to dimethylol-propionic acid and dimethylolbutyric acid because it is only with these acids that no reaction between the carboxyl groups and the isocyanate groups takes place. Moreover, it is necessary to use a large quantity of a highly polar solvent because, otherwise, resins which crystallize are obtained, which are extremely difficult to process. Moreover, for many of the sugsequent reactions envisaged, it is necessary to remove the solvent in a separate process because it would interfere with these reactions. For these reasons, such isocyanate carboxylic acids cannot be used, for example, for the production of polyurethane foams. Other methods have therefore had to be employed for the direct production of solid polyurethane ionomers, for example, the introduction of tertiary nitrogen functions by way of suitable polyols followed by alkylation to a quaternary ammonium salt. It is also known (U.S. Pat. Nos. 3,756,992 and 3,479,310) to modify higher molecular weight reaction products of polyether polyols or polyester polyols and polyisocyanates, so-called prepolymers which generally have an isocyanate content of between 2 and 6%, with carboxyl groups or carboxylate groups. These products are generally highly viscous and can be processed by the usual methods only for special purposes. The possibilities of using them are restricted by their viscosity, which is generally too high and, above all, by their low isocyanate content. For example, they cannot be used for the production of polyurethane foams. Moreover, they are not stable in storage but continue to react to form high molecular weight and cross-linked products. Liquid polyisocyanate carboxylic acids with high isocyanate contents such as are required for producing foams plastics have previously been unknown.

It is therefore an object of this invention to provide storage stable organic polyisocyanates having carboxyl or carboxylate groups which are adapted for use in making polyurethane foams and inorganic-organic plastics. Another object of the invention is to provide a novel process for making organic polyisocyanates containing carboxyl or carboxylate groups.

The foregoing objects and others are accomplished in accordance with this invention, generally speaking, by providing a process for the production of liquid aromatic polyisocyanates containing carboxyl and/or carboxylate groups, which is characterized in that liquid multicomponent mixtures of aromatic polyisocyanates which have an isocyanate content of about 10 to about 42% by weight and a viscosity of about 8 cP to about 10,000 cP at 25°C are reacted with a. compounds which contain carboxylate groups and hydrogen atoms which are reactive with isocyanate groups or b. hydroxycarboxylic or mercaptocarboxylic acids such that ba. during or after the isocyanate addition reaction, the carboxyl groups are at least partly converted into the corresponding carboxylate groups by neutralization with a base, or bb. the hydroxycarboxylic or mercaptocarboxylic acids used are of the kind in which the carboxyl groups are much less reactive with isocyanate groups than are the hydroxy or mercapto groups, the quantitative proportions of the reactants being chosen so that the products of the process will have an isocyanate content of 10 to 40% by weight and a carboxyl or carboxylate group content of 0.1 to 10% by weight.

It has now surprisingly been found that liquid aromatic polyisocyanatocarboxylic acids and polyisocyanatocarboxylates can be obtained by modifying liquid multicomponent mixtures of aromatic polyisocyanates having an isocyanate content of about 10 to about 40% and a viscosity of about 8 cP to about 10,000 cP at 25°C with certain carboxylic acids or carboxylates which still contain groups which are reactive with isocyanate groups. The process according to the invention has, for the first time, made available liquid aromatic polyisocyanates containing carboxyl and/or carboxylate groups and, at the same time, having a high isocyanate content, for example, 10 to 40% and preferably 18% to 35% by weight which are stable in storage and free from sedimentation.

The invention also provides organic polyisocyanates containing carboxyl and/or carboxylate groups which can be obtained by the novel process.

Liquid multicomponent mixtures of aromatic polyisocyanates suitable for the process provided by the invention are, in particular, those with an isocyanate content of 10 to 42% by weight, preferably 18 to 35% by weight, and a viscosity of 8 cP to 10,000 cP, preferably 50 cP to 5000 cP at 25°C.

The liquid aromatic polyisocyanate mixtures used for the process according to the invention are preferably the phosgenation products of aniline/formaldehyde condensates which contain 20 to 80% by weight of dinuclear diisocyanates, 8 to 40% by weight of trinuclear triisocyanates, 3 to 20% by weight of tetranuclear tetraisocyanates and 2 to 40% by weight of higher nuclear polyisocyanates. Polyisocyanate mixtures of this kind generally have a viscosity above 50 cP at 25°C. These phosgenation products which have a viscosity of 100 cP to 2000 cP at 25°C are particularly suitable.

Another liquid multicomponent mixture of aromatic polyisocyanates which is also particularly preferred as a starting material is a phosgenation product of aniline/-formaldehyde condensates containing 30 to 100% by weight of dinuclear diisocyanates, of which at least 10% is made up of 2,2'- and/or 2,4'-isomers, 0 to 20% by weight of trinuclear triisocyanates and 0 to 4% by weight of tetranuclear and higher nuclear polyisocyanates. Mixtures of 40 to 90% of a phosgenation product of aniline formaldehyde condensates containing 70 to 100% (in particular 81 to 95%) of dinuclear isocyanates and 10 to 60% of tolylene diisocyanate are also particularly suitable. The first runnings obtained from the distillation of phosgenation products of aniline formaldehyde condensates, containing 20 to 80% of 2,2'-and 2,4'-diisocyanatodiphenylmethane, are also eminently suitable. These products have an exceptionally low viscosity of about 8 cP to 50 cP at 25°C. Owing to the fact that they contain isocyanates with isocyanate groups in the ortho-position, these mixtures can be modified with carboxyl groups without sedimentation in spite of their low viscosity.

The commercial distillation residues which are obtained from the distillation of commercial tolylene diisocyanate mixtures and which contain less than 50% by weight of free tolylene diisocyanate isomers are also eminently suitable for the process provided by the invention. Distillation residues of this kind can be obtained, for example, by the process disclosed in U.S. Ser. No. 161,817 filed July 12, 1971. The distillation residues described in German Patent Application No. P 21 23 183.4 as well as their solutions in the phosgenation products of aniline formaldehyde condensates which are also described in the last mentioned German Patent Application are also particularly suitable.

Other suitable isocyanate components for the process provided by the invention include the phosgenation products of condensates of aniline and aldehyde or ketones such as acetaldehyde, propionaldehyde, butyraldehyde, acetone or methyl ethyl ketone and the like. The phosgenation products of condensates of anilines which are substituted with alkyl groups on the nucleus, such as toluidines, with aldehydes or ketones such as formaldehyde, acetaldehyde, butyraldehyde, acetone or methyl ethyl ketone are also suitable.

Reaction products of the above mentioned aromatic polyisocyanate mixtures with 0.2 to 25 mol % of polyols are also suitable for the process according to the invention, provided that the viscosity of the resulting reaction products does not exceed 10,000 cP at 25°C and the isocyanate content of the reaction product is at least 10% by weight.

Any suitable polyol may be used for modifying the starting materials such as, for example, the polyether and/or polyester polyols well known in polyurethane chemistry which have a molecular weight of about 200 to about 6000, preferably about 300 to about 4000 as well as low molecular weight polyols with a molecular weight of 62 to about 200. Examples of such low molecular weight polyols include the glycols and other polyhydric alcohols such as, ethylene glycol, propylene glycol, glycerol, trimethylolpropane, 1,3,6-hexanetriol and the like.

Suitable starting compounds for the process according to the invention also include the reaction products of the monomeric organic polyisocyanates well known in polyurethane chemistry, such as 2,4-diisocyanatotoluene, 2,6-diisocyanatotoluene or 4,4'-diisocyanatodiphenylmethane, with 1 to 25 mol % of the polyols mentioned above, the same restrictions applying as regards the isocyanate content and the viscosity of the reaction products. Other suitable organic polyisocyanates are those disclosed by Saunders and Frisch in the book *Polyurethanes: Chemistry and Technology*, published by Interscience Publishers. The starting materials for the process according to the invention are, in all cases, mixtures which contain at least 2 different isocyanates.

When using the phosgenation products of aniline formaldehyde which contain an exceptionally low proportion of dinuclear isocyanates and therefore have an unfavorably high viscosity, e.g. more than 5000 cP, it might be advisable to add 1 to 30% by weight of tolylene diisocyanate or 2,4'-diphenylmethane diisocyanate in a pure or commercially crude form before or after modification with carboxyl groups, in order to lower the viscosity.

Any suitable polyhydroxy carboxylic acid or mercaptocarboxylic acid may be used for preparing the novel polyisocyanates such as, for example, mono- and/or di- and/or polyhydroxycarboxylic acids or mercaptocarboxylic acids including 1. aliphatic or cycloaliphatic monohydroxycarboxylic acids and monomercaptocarboxylic acids, such as α-hydroxybutyric acid, hydroxypentanoic acids, lactic acid, ricinoleic acid, malic acid, citric acid, thioglycollic acid, α-mercaptopropionic acid or the like;
2. aliphatic or cycloaliphatic dihydroxycarboxylic acids and mercaptocarboxylic acids, for example glyceric acid, trimethylolacetic acid, tartaric acid, 1,1-dimethylol-propionic acid, 1,1-dimethylolbutyric acid, dihydroxy-maleic acid, dihydroxyfumaric acid, 1,2-bis-mercaptoglyceric acid or the like;
3. aliphatic polyhydroxypolycarboxylic acids such as mucic acid, saccharic acid, tartaric acid or the like;
4. compounds containing hydroxyl, ester and carboxyl groups obtained by reacting alkane or cycloalkane polyols with a molecular weight of about 62 to about 1000 with less than equivalent quantities of intramolecular carboxylic acid anhydrides. In this context, the term "less than equivalent quantity" means that the reactants for preparing the reaction products are used in quantities such that a maximum of n minus 0.7 equivalents of carboxylic acid anhydride groups but at least 0.5 and preferably at least 0.7 equivalents of carboxylic acid anhydride groups are used per mol of n-valent polyol. The reaction products which contain hydroxyl, ester and carboxyl groups are obtained from the starting components, for example by simply heating them to 70° to 120°C for 30 to 120 minutes. In the simplest case, for example, β-hydroxy-ethylsuccinic acid ester is obtained from ethylene glycol and succinic acid anhydride used in a molar ratio of 1:1. From 1 mol of pentaerythritol and 3 mols of phthalic acid anhydride, a corresponding reaction product is obtained which has a statistical average of one hydroxyl group, three ester groups and three carboxyl groups; this can also be used for the process of the invention.

Suitable polyols for preparing the reaction products have a valency of $n = 2$ to 12, preferably 2 to 4. The coresponding mercaptans or mercaptoalcohols can, of course, be used instead of the polyols, although it is preferred to use polyols which are free from mercapto groups. The following are examples of suitable polyols and mercaptans: ethylene glycol; propane-1,2-diol; propane-1,3-diol; butane-1,2-diol; butane-1,3-diol; butane-1,4-diol; hexane diols; octane diols; decane diols; undecane diols; cyclohexane dimethanol; resorcinol; pyrocatechol; hydroquinone; glycerol; trimethylolethane; trimethylolpropane; trimethylol hexane; pentaerythritol; glucose; cane sugar; diethylene glycol; triethylene glycol and the like. Mercaptoalcohols such as mercaptoethanol, thioglycerol; monothio-1,1,1-trimethylol propane; monothio-1,1,1-trimethylolethane and the like are also suitable.

Suitable carboxylic acid anhydrides are any intramolecular carboxylic acid anhydrides, e.g. maleic acid anhydride; succinic acid anhydride, glutaric acid anhydride; o-phthalic acid anhydride; tetrahydrophthalic acid anhydride; hexahydrophthalic acid anhydride; the isomeric methyl- and ethyl-tetrahydrophthalic acid anhydrides; the isomeric methyl- and ethyl-hexahydrophthalic acid anhydrides; trimellitic acid anhydride; endomethylene-tetrahydrophthalic acid anhydride; 4-chlorophthalic acid anhydride; 4-bromophthalic acid anhydride; 1,4,5,6,7,7-hexachloro-bicyclo-(2,2,1)-heptane-5-dicarboxylic acid-(2,3)-anhydride, diglycollic acid anhydride and the like.

Carboxylic acid anhydrides of polycarboxylic acids which have the carboxyl groups adjacent to each other, i.e. in the 1,2-positions, are preferred, e.g. maleic acid anhydride; succinic acid anhydide; phthalic acid anhydride; tetrahydrophthalic acid anhydride; hexahydrophthalic acid anhydride and the like.

In one embodiment of the process according to the invention, the polyisocyanate mixtures are reacted exclusively with the above-mentioned carboxylic acids which contain hydroxyl or mercapto groups to produce liquid polyisocyanates which contain carboxylic acid groups. The proportions in which the reactants are used are chosen so that the products of the process contain 0.1 to 10% by weight, preferably 0.5 to 3.5% by weight of carboxyl groups and 10 to 40% by weight preferably 18 to 35% by weight of isocyanate groups. The reaction is generally carried out without solvents at 0° to 150°C, preferably 60° to 130°C, after mixing the reactants. In special cases, the reaction may also be carried out in the presence of small quantities (1 to 10% by weight) of solvents. The solvents should be inert towards both the isocyanate groups and the modifying agents which contain carboxyl groups. The solvents, if used, are preferably aromatic or polar solvents such as ethers, esters, ketones or halogenated hydrocarbons with a boiling point between 60° and 140°C. The reaction time depends on the reaction temperature and the reactivity of the isocyanate groups or of the hydroxyl or mercapto groups. The time required to complete the reaction may vary from a few minutes to about 3 hours. If desired, the reactants may simply be mixed at room temperature and left to react, especially when using low viscosity isocyanates.

The viscosity of the reaction mixture generally rises during the modification reaction. One should therefore, endeavor not to use too high a proportion of modifying agent which contains carboxyl groups. The quantity of this substance is generally chosen, as described above, so that the reaction products will contain from 0.1 to 10% by weight of carboxyl groups. Although a quantity below this range may be employed, polyisocyanates which are modified with such small quantities of carboxyl groups generally have little commercial importance. The upper limit may also be exceeded, but the viscosity then generally rises so steeply that the reaction can only be carried out in the presence of substantial quantities of solvent. Moreover, the products obtained in this way are generally too hydrophilic.

Carboxyl group contents of from 0.5 to 3.5% by weight are particularly preferred.

The carboxyl and/or carboxylate group content which can be obtained while maintaining the liquid aggregate state depends among other things on the viscosity of the isocyanate mixture used. Low viscosity products can easily be obtained with carboxyl group contents of 0.5 to 5% whereas the quantity of carboxyl groups employed is generally not more than 0.5% if the starting viscosity is above 5000 cP. Polyisocyanates with a viscosity below 700 cP are preferably modified with 0.5 to 5% of carboxyl groups.

In this embodiment of the process provided by the invention, it should be noted that although aliphatically bound hydroxyl or mercapto groups are generally more reactive with isocyanate groups than are carboxyl groups, there is still the possibility, especially at the higher reaction temperatures employed within the given range of 0° to 150°C, that sterically unhindered carboxyl groups may at least partly undergo the known reaction with isocyanate groups which are present in excess to form carbonamides with evolution of carbon dioxide. For this embodiment of the process according to the invention, it is therefore particularly preferred to use hydroxyl carboxylic acids or mercapto carboxylic acids with sterically hindered carboxyl groups to produce products which contain carboxyl and isocyanate groups. These sterically hindered hydroxyl or mercaptocarboxylic acids include e.g. the 1,1-dimethylolalkane carboxylic acids mentioned under (2) above and particularly the reaction products under (4) of aliphatic or cycloaliphatic polyols or mercaptans with the preferred acid anhydrides of polycarboxylic acids in which the carboxyl groups are adjacent to each other. If these sterically hindered hydroxyl or mercaptocarboxylic acids are used and the process according to the invention is carried out as described above, practically no carbonamide formation with the evolution of carbon dioxide takes place. The products obtained by this embodiment of the process are liquid products which contain carboxyl and isocyanate groups or products in which the carboxyl groups are partly in the form of an adduct with isocyanate groups. These carboxyl-isocyanate adducts are in reversible equilibrium with the free carboxyl and isocyanate groups. These adducts have exactly the same reactivity as the systems in which the carboxyl groups and isocyanate groups are free. For this reason, the term "isocyanates which contain carboxyl groups" used in the context of this invention also includes systems in which the said groups are in the form of this reversible adduct.

The embodiment described here of the process according to the invention can also be carried out with hydroxyl or mercaptocarboxylic acids which contain sterically unhindered carboxylic acid groups, if partial conversion of the carboxyl groups into carbonamide groups is acceptable. The side reaction leading to the formation of carbonamide groups may then simply be compensated for by using a corresponding excess of hydroxyl or mercapto carboxylic acid.

According to a second embodiment of the process according to the invention, the isocyanatocarboxylic acids obtainable by the embodiment of the process described above may be partly or completely converted into the corresponding isocyanatocarboxylates by a neutralization reaction after they have been prepared. These carboxylates are also liquid although neutralization of the isocyanatocarboxylic acids is frequently accompanied by an increase in viscosity. The hydrophilic character and reactivity of the products are also considerably increased by this neutralization. In many cases, this reduces the stability in storage and for this reason neutralization, if necessary, should preferably be carried out only shortly before the product is required for use. Furthermore, it may be advisable to carry out only a partial neutralization, e.g. to neutralize 5 to 40% of the free carboxyl groups present. When neutralization is carried out with amines or strong alkalies a degree of neutralization of 5 to 20% is preferred. The neutralization agents used may be organic or inorganic bases, e.g. trimethylamine, triethylamine, tributylamine, dimethylaniline, urotropin, sodium bicarbonate, sodium hydroxide, calcium carbonate, magnesium carbonate, calcium hydroxide, magnesium hydroxide, calcium oxide, magnesium oxide, zinc oxide, sodium phosphate or the like. Inorganic neutralizing agents which are not strongly basic in reaction such as calcium carbonate, magnesium carbonate, dolomite, chalk or sodium phosphate may be used in large excess to serve as fillers. The hydrophilic character and reactivity of the products provided by the invention are substantially increased by converting the carboxyl groups into the corresponding carboxylate groups. When neutralizing the carboxyl groups, it should be noted that the use of inorganic bases as neutralizing agents causes the liberation of water which undergoes a secondary reaction with the isocyanate groups to form ureas, biurets and similar by-products so that the isocyanate functionality is reduced. If it is necessary to avoid this, it is advisable to carry out neutralization with a tertiary amine such as triethylamine, tributylamine, or the like.

According to a third embodiment of the process according to the invention, the modification of the liquid polyisocyanate mixtures is carried out using hydroxyl or mercapto carboxylates which can be obtained by neutralizing the acids mentioned under (1) and (4) above. Since the liquid polyisocyanate mixtures have very little compatibility with the usual alkali metal or alkaline earth metal salts of the acids mentioned under (1) to (4) above, it is advantageous in this embodiment of the process according to the invention to neutralize the acids mentioned as examples under (1) to (4) by reacting them with aliphatic tertiary amines such as tributylamine, triisopropylamine, N-dimethylcyclohexylamine, N-methylmorpholine or N,N-dimethylstearylamine so as to obtain the modifying agents with carboxylate groups which are compatible with the liquid polyisocyanates.

The products obtainable by the second and third embodiments of the process according to the invention have the particular advantage over the pure isocyanatocarboxylic acids of being more reactive with inorganic materials such as aqueous waterglass.

The liquid polyisocyanates with carboxyl or carboxylate groups obainable by the process according to the invention are characterized by
a. an isocyanate content of 10 to 40% by weight, preferably 18 to 35% by weight,
b. a carboxyl or carboxylate group content of 0.1 to 10% by weight, preferably 0.5 to 3.5% by weight, which can be confirmed by potentiometric or infra red spectroscopic methods,
c. a viscosity of 100 cP to 80,000 cP at 25°C; and
d. an average isocyanate functionality of 1.9 to 4.0.

The isocyanate content of the products can be determined by the known method of titration with dibutylamine, the result obtained being corrected by the amount of dibutylamine used up by the carboxyl groups.

In addition to the groups mentioned under a) and b) above which are essential to the invention, the products of the process contain up to 10% by weight each of urea, biuret, urethane and/or allophanate groups, which can be attributed to side reactions. Urethane groups are, of course, always present in the products of the process.

The liquid polyisocyanatocarboxylic acids and their salts with an isocyanate content of between 10 and 40% preferably 18 to 35%, which can be obtained by the process provided by the invention were not previously known. These substances are in many ways particularly suitable for the production of foam plastics and compact synthetic resins. They can be processed without difficulty by the usual techniques such as casting processes and the methods employing the usual conveyor systems and feed systems. It is surprisingly found that the products frequently have a high stability in storage.

In contrast to the corresponding polyisocyanates used as starting materials, the products according to the invention have excellent compatibility with both hydrophobic and hydrophilic reactants, in particular with polyethylene oxide polyethers, ionomeric glycols and amine salts of various kinds, water and aqueous salt solutions. The polyisocyanates provided by the invention are, for this reason, particularly valuable for use in the production of hydrophilic foam plastics by the isocyanate polyaddition process, in particular ionomer foams which may be used, for example, as ion exchangers and agricultural foams.

Due to the modification according to the invention, the products of the process also have a greatly increased interaction with inorganic materials, for example those based on silicates. The corresponding unmodified polyisocyanates have practically no interaction with inorganic substances. The products according to the invention are therefore eminently suitable for use as isocyanate components for the producton of inorganic-organic synthetic resins according to the process of U.S. Ser. No. 364,763 filed May 29, 1973.

EXAMPLES

Starting materials

I. Reaction product of 1 mol or tripropylene glycol with 5 mols of 4,4'-diphenylmethane diisocyanate (23% by weight of isocyanate).

II. Diisocyanatodiphenylmethane is distilled off the crude phosgenation product of an aniline formaldehyde condensate in such a quantity that the distillation residue has a viscosity of 100 cP at 25°C. (Dinuclear portion: 59.7% by weight; trinuclear portion: 21.3% by weight; proportion of higher nuclear polyisocyanates: 19.0% by weight).

III. Prepared similarly to II polyisocyanate, but having a viscosity of 200 cP at 25°C. (Dinuclear portion: 44.3% by weight; trinuclear portion: 23.5% by weight; proportion of higher nuclear polyisocyanates: 32.2% by weight).

IV. Prepared similarly to polyisocyanate II with a viscosity of 400 cP at 25°C. (Dinuclear portion: 45.1% by weight; trinuclear portion: 22.3% by weight; proportion of higher nuclear polyisocyanates: 32.6% by weight).

V. Prepared similarly to polyisocyanate II with a viscosity of 500 cP at 25°C. (Dinuclear portion: 40.6% by weight; trinuclear portion: 27.2% by weight; proportion of higher nuclear polyisocyanates: 32.2% by weight).

VI. Prepared similarly to polyisocyanate II with a viscosity of 700 cP at 25°C. (Dinuclear portion: 40.3% by weight; trinuclear portion: 34.0% by weight; proportion of higher nuclear polyisocyanates: 25.7% by weight).

VII. 20% solution of a distillation residue from the distillation of commercial tolylene diisocyanate in the crude phosgenation product of an aniline-formaldehyde condensate. Viscosity at 25°C: 1260 cP; NCO content: 29.3% by weight.

VIII. 40% solution of the above-mentioned distillation residue in the crude phosgenation product of an aniline-formaldehyde condensate. Viscosity at 25°C: 2970 cP; NCO content: 29.6% by weight.

General Method of Preparation

The aromatic polyisocyanate was introduced into the reaction vessel and the compound containing carboxyl groups was added at a convenient temperature. The reaction mixture was then stirred, filtered if necessary and any solvent present was distilled off under a reduced pressure.

Starting materials for the liquid aromatic polyisocyanates according to the invention

| Hydroxycarboxylic acids | | prepared from (molar ratio 1:1) in 1-3 hours at 105-125°C | OH number | acid number |
|---|---|---|---|---|
| | A | 1,1,1-Trimethylolpropane/tetrahydrophthalic acid anhydride | 400 | 209 |
| | B | 1,1,1-Trimethylolpropane/tetrahydrophthalic acid anhydride* | 328 | 227 |
| | C | 1,1,1-trimethylolpropane.3EOX/phthalic acid anhydride | 258 | 116 |
| | D | 1,1,1-trimethylolpropane/maleic acid anhydride | 392 | 133 |
| | E | 1,1,1-trimethylolpropane.3EOX/tetrahydrophthalic acid anhydride | 260 | 120 |
| | F | 1,1,1-trimethylolpropane/hexahydrophthalic acid anhydride | 372 | 188 |
| | G | 1,1,1-trimethylolpropane.3EOX/glutaric acid anhydride | 249 | 114 |
| | H | 1,1,1-trimethylolpropane.3EOX/trimellitic acid anhydride | 192 | 173 |
| | I | 1,1,1-trimethylolpropane.3EOX/maleic acid anhydride | 278 | 129 |
| | K | glycerol/maleic acid anhydride | 453 | 231 |
| | L | 1,1,1-trimethylolpropane/phthalic acid anhydride | 372 | 189 |

*Molar ratio 1:1.2
ηEOX ethylene oxide
■ modified with n moles of ethylene oxide Reaction to produce the liquid, aromatic polyisocyanates according to the invention
(2 hours at 100°C)

| Example | Polyisocyanate | | Hydroxycarboxylic acid | | —COO$^{(-)}$ groups | NCO | Viscosity |
|---|---|---|---|---|---|---|---|
| | g | Type | g | Type | % by weight | % by wt. | cP (25°C) |
| 1 | 1182 | II | 18 | E | 0.15 | 29.1 | 160 |
| 2 | 1182 | III | 18 | E | 0.15 | 30.2 | 320 |
| 3 | 1182 | IV | 18 | E | 0.15 | 30.2 | 570 |
| 4 | 1182 | V | 18 | E | 0.15 | 29.6 | 940 |
| 5 | 1182 | VI | 18 | E | 0.15 | 29.2 | 1500 |
| 6 | 1182 | IV | 18 | A | 0.16 | 29.4 | 680 |
| 7 | 1182 | IV | 18 | B | 0.13 | 29.7 | 680 |
| 8 | 1182 | IV | 18 | C | 0.10 | 30.0 | 550 |
| 9 | 1182 | IV | 18 | L | 0.15 | 29.8 | 580 |
| 10 | 900 | III | 100 | I | 1.1 | 24.4 | 50,000 |
| 11 | 900 | IV | 100 | E | 1.0 | 24.8 | 50,000 |
| 12 | 900 | VI | 100 | I | 1.1 | 23.2 | 50,000 |
| 13 | 800 | III | 200 | D | 3.1 | 18.6 | thick liquid |
| 14 | 800 | III | 200 | F | 2.0 | 20.8 | thick liquid |
| 15 | 800 | III | 200 | H | 1.6 | 21.2 | thick liquid |
| 16 | 800 | III | 200 | K | 3.5 | 18.2 | |
| 17 | 900 | I | 100 | E | 0.15 | 18.2 | 1950 |
| 18 | 1182 | VII | 18 | G | 0.16 | 28.8 | 2100 |
| 19 | 1182 | VIII | 18 | G | 0.16 | 29.0 | 4500 |

Reaction to produce the polyisocyanates according to the invention

| Example | Polyisocyanate | | Carboxylic acid | | —COO$^{(-)}$ | NCO | Viscosity | Reaction Conditions |
|---|---|---|---|---|---|---|---|---|
| | g | Type | g | Type | % by wt. | % by wt. | 25°C | |
| 20 | 2166 | II | 33.5 | DMP | 0.5 | 29.2 | 420 | 2 hours/100°C |
| 21 | 2166 | II | 33.5 | DMP | 0.5 | 29.1 | 433 | 2 hours/140°C |
| 22 | 2133 | II | 67.0 | DMP | 1.0 | 27.4 | 730 | 6 hours/100°C |
| 23 | 2166 | IV | 33.5 | DMP | 0.5 | 29.5 | 670 | 2 hours/130°C |
| 24 | 2133 | IV | 67 | DMP | 1.0 | 28.6 | 5700 | 2 hours/130°C |
| 25 | 2100 | IV | 100 | DMP | 1.5 | 27.7 | 10,500 | 2 hours/130°C |
| 26 | 2160 | III | 40 | DMB* | 0.6 | 28.4 | 490 | 2 hours/100°C |
| 27 | 2160 | IV | 40 | DMB | 0.6 | 28.7 | 1070 | 2 hours/100°C |
| 28 | 2160 | VI | 40 | DMB | 0.6 | 27.2 | 1600 | 2 hours/100°C |
| 29 | 2120 | III | 80 | HS-(CH$_2$)$_2$—COOH | 1.7 | 22.0 | 670 | 2 hours/130°C |
| 30 | 2120 | III | 80 | HOOC—(CHOH)$_4$—COOH** | 0.8 | 18.0 | 11,000 | 2 hours/130° C |
| 31 | 2120 | III | 80 | salicylic acid | 1.5 | 22.1 | 800 | 2 hours/130°C |

-continued
Reaction to produce the polyisocyanates according to the invention

| Example | Polyisocyanate g | Type | Carboxylic acid g | Type | —COO$^{(-)}$ % by wt. | NCO % by wt. | Viscosity 25°C | Reaction Conditions |
|---|---|---|---|---|---|---|---|---|
| 32 | 1230 | IV | 120 | B | 1.5 | 24.6 | 12,100 | 2 hours/130°C |

DMP = dimethylolpropionic acid
DMB = dimethylolbutyric acid
* = reaction mixture contained 100 ml of methylisobutylketone; was distilled off
** = formation of coarse sediment

EXAMPLE 33 (NEUTRALIZATION)

78 g hydroxycarboxylic acid E with a hydroxyl number of 260 and an acid number of 120 are reacted with 1362 g of polyisocyanate III at 80°C for 2 hours and partially neutralized with increasing quantities of the base tri-n-butylamine. The isocyanate content and viscosity at 25°C are determined in each case. 10%, 20%, 30% and 50% of the carboxyl groups present in the polyisocyanate according to the invention are neutralized. The figures are shown in the table.

| g of Substance | g of Tributylamine | % of theory | $\eta 25$ (cP) | NCO(%) |
|---|---|---|---|---|
| 170 | — | — | 2500 | 26.9 |
| 320 | 0.74 | 10 | 2050 | 25.8 |
| 320 | 1.48 | 20 | 1980 | 25.8 |
| 320 | 2.22 | 30 | 1900 | 25.9 |
| 320 | 3.70 | 50 | 1800 | 25.5 |

EXAMPLE 34

Partial neutralization followed by reaction with polyisocyanate according to Method III 39 g of hydroxycarboxylic acid E with a hydroxyl number of 260 and an acid number of 120 are intimately mixed with 8.3 g of tri-n-butylamine. 50% of the theoretical amount of all the carboxyl groups present are converted into carboxylate groups with mild heating. The liquid product, which has only become slightly more viscous, is then mixed with 681 g of polyisocyanate III and the mixture is kept at 80°C with stirring for 1.5 hours. After filtering off traces of sediment, a liquid polyisocyanate which contains carboxyl groups and carboxylate groups is obtained which has the following characteristics:

| | |
|---|---|
| Isocyanate content: | 26.4% by weight |
| $\eta 22$: | 2650 cP |
| Carboxyl group content (calculated): | 0.27 % by weight |

The following examples demonstrate the use of the liquid aromtic polyisocyanates according to the invention for producing high quality grouting compositions, casting compositions, lightweight foams and inorganic-organic foam concretes.

EXAMPLE A

Grouting Composition

50 Parts of polyisocyanate (Example 11) are mixed with 150 parts of polyisocyanate IV and then vigorously stirred up with 150 parts of 44% waterglass ($Na_2O:SiO_2 = 1:2$) using a high speed stirrer. 600 Parts of quick-setting cement are then added and the substance is mixed with a stirrer rod until a homogeneous, pliant mass which can be applied with a filling trowel has been formed. This remains completely suitable for application for up to 10 minutes, is still barely deformable after 2 hours and becomes stone hard and free from pores in about 5 hours. If desired, the mass may be hardened by the application of heat, for example, at 80°C for 20 minutes.

EXAMPLE B

Casting Composition

The procedure is the same as described under A) but only 100 parts of quick setting cement are used (instead of 600 parts) and mixing is carried out for about 1 minute with a high speed stirrer. The composition obtained is suitable for casting and has excellent adherence both to organic surfaces and particularly to inorganic surfaces. It begins to set after 6 minutes, is still slightly deformable after 3 hours and has become rock hard after 24 hours. It is porous to only a minor extent. In this example also hardening may be accelerated by heating if desired (30 minutes at 80°C).

EXAMPLE C

Inorganic-organic silicate-based foam
Component 1:
   200 g of polyisocyanate (Example 32)
   20 g of trichlorofluoromethane
   100 g of quicklime
Component 2:
   150 g of waterglass
   3 g of catalyst (hexahydrotriazine derivative)
   0.25 g of emulsifier, sodium salt of a sulphochlorinated $C_{10}$–$C_{14}$ paraffin mixture.

Components 1 and 2 are mixed separately and then vigorously stirred together, using a high speed stirrer for 15 seconds, and the resulting mixture is then poured into a paper container. The resulting inorganic-organic foam was found to have a fine, regular pore structure and after drying (3 hours at 120°C) it had a density of 271 kg/m$^3$ and a compression strength of 26.4 kp/cm$^2$.

The following readings were taken during the foaming process:

| | |
|---|---|
| Stirring time: | 20 seconds ($t_R$) |
| Resting time: | 25 seconds ($t_L$) (onset of foaming) |
| Complete reaction time: | 35 seconds ($t_A$) (end of foaming) |
| Rising height: | 6.5 cm |

EXAMPLE D

The procedure is completely the same as that employed in Example C but only 150 g of the polyisocyanate according to the invention is used (Example 32). In this case, the density drops to 200 kg/m$^3$ and the compression strength to 14.8 kp/cm$^2$.

EXAMPLE E

Component 1:

140 g of polyisocyanate (Example 32)
150 g of quick-setting cement
30 g of chlorinated mixture of paraffins ("Witaclor 71", Fa. Dynamit Nobel).
23 g of trichlorofluoromethane
Component 2:
150 g of waterglass
100 g of quick-setting cement
1 g of triethylamine
0.1 g of the emulsifier from Example C.

The two components are mixed as described in Example C and result in an inorganic-organic foam with a regular, fine cell structure, a density of 272 kg/m$^3$ and a compression strength of 17.3 kp/cm$^2$.

EXAMPLES F TO H

Inorganic-organic lightweight foams

|  | F | G | H |
|---|---|---|---|
| Polyisocyanate Example 3 | 100 g | 100 g | 100 g |
| Trichlorofluoromethane | 7 g | 8 g | 15 g |
| Waterglass | 75 g | 75 g | 75 g |
| Hexahydrotriazine derivative | 3.0 g | 1.5 g | — |
| Polyether polysiloxane* | 3.0 g | 3.0 g | 3.0 g |
| Rising height | 80 cm | 130 cm | 210 cm |
| Density (kp/cm$^2$) | 61 | 39 | 19 |

*silicon content 10.4%, stabilizer.

To prepare these lightweight foams which are free from fillers, polyisocyanate and blowing agent are first mixed, as are also the waterglass, activator and stabilizer*. The components are then mixed together with the aid of a high speed stirrer and poured into a paper container.

The following Table shows the results obtained in the practical examples I to Q (all figures given in grams unless otherwise indicated):

ii. distillation residues obtained from the distillation of crude tolylene diisocyanate mixture and which residues contain less than about 50% by weight of free tolylene diisocyanate isomers;

iii. reaction products of (i) or (ii) and 0.2 to 25 mol % of an organic polyol;

iv. a mixture of (i) and from 1 to 30% by weight of an isocyanate selected from the group consisting of tolylene diisocyanate and 2,4'-diphenylmethane diisocyanate; and v. mixtures thereof, and B. a compound selected from the group consisting of:
i. carboxylic acid salts of an hydroxycarboxylic or mercapto carboxylic acid; and ii. an hydroxy carboxylic or mercapto carboxylic acid wherein
a. at least partial conversion of carboxyl group into the corresponding carboxylate group by neutralization with a base is carried out simultaneously with or after the isocyanate addition reaction, or
b. the hydroxy carboxylic acid or mercapto carboxylic acid is of the kind which the carboxyl groups are much less reactive with isocyanate groups than are the hydroxy or mercapto groups, the product of said process having an isocyanate content of from 18 to 35% by weight and having a carboxyl or carboxylate group content of from 0.1 to 10% by weight.

2. The product of claim 1 wherein said compound (B) is a hydroxy carboxylic acid and wherein said hydroxy carboxylic acid is a reaction product containing

| Example | I | K | L | M | N | O | P | Q |
|---|---|---|---|---|---|---|---|---|
| Polyisocyanate 10 | 200 | 150 | 150 | — | — | — | — | — |
| Polyisocyanate 11 | — | — | — | 100 | — | — | — | — |
| Polyisocyanate 12 | — | — | — | — | 100 | 100 | 100 | 100 |
| II | — | — | — | — | — | — | 100 | — |
| III | — | — | 50 | — | — | — | — | 100 |
| IV | — | 50 | — | 100 | 100 | — | — | — |
| VI | — | — | — | — | — | 100 | — | — |
| Trichlorofluoromethane | 20 | 20 | 20 | 20 | 20 | 20 | 20 | 20 |
| Waterglass | 150 | 150 | 150 | 150 | 150 | 150 | 150 | 150 |
| Triethylamine | 2.5 | 2.5 | 2.5 | 2.5 | 2.5 | 2.5 | 2.5 | 2.5 |
| Emulsifier from Example C | 0.1 | 0.1 | 0.1 | 0.1 | 0.1 | 0.1 | 0.1 | 0.1 |
| Rising height (cm) | 52 | 77 | 87 | 97 | 88 | 75 | 110 | 118 |
| $t_R$ (sec) | 15 | 15 | 15 | 15 | 15 | 15 | 15 | 15 |
| $t_L^*$ (sec) | 33 | 30 | 27 | 27 | 26 | 25 | 26 | 28 |
| $t_A^*$ (sec) | 37 | 34 | 33 | 32 | 32 | 27 | 31 | 35 |
| Unit weight (kg/m$^3$) | 199 | 154 | 129 | 114 | 131 | 175 | 111 | 103 |
| Compression strength (kp/cm$^2$) | 16.1 | 15.8 | 10.4 | 6.6 | 9.3 | 21.5 | 5.3 | 4.0 |

*see Example C for the definition of $t_R$, $t_L$, and $t_A$.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Liquid aromatic polyisocyanates which contain carboxyl or carboxylated groups, prepared by a process which comprises reacting:
A. a liquid multicomponent mixture of aromatic polyisocyanates which have an isocyanate content of 18 to 35% by weight and a viscosity of 8 cP to 10,000 cP at 25°C, said multicomponent mixture selected from the group consisting of:
i. phosgenation products of the condensates of:
a. aniline or alkyl groups substituted anilines, and
b. aldehydes or ketones;

hydroxyl, carboxyl and ester groups and is obtained by reacting a polyhydric alcohol with a molecular weight of between 62 and 10,000 with a polycarboxylic acid anhydride.

3. The product of claim 1, wherein the liquid multicomponent mixture is a phosgenation product of an aniline-formaldehyde condensate which contains 20 to 80% by weight of dinuclear diisocyanates, 8 to 40% by weight of trinuclear triisocyanates, 3 to 20% by weight of tetranuclear tetraisocyanates, and 2 to 40% by weight of higher nuclear polyisocyanates.

4. The product of claim 1 wherein the liquid multicomponent mixture of aromatic polyisocyanates contains phosgenation products of aniline-formaldehyde condensates with a dinuclear isocyanate content of 30 to 100% by weight, at least 10% of which consists of 2,2'- and/or 2,4'isomers, a trinuclear triisocyanate content of 0 to 20% by weight and a tetranuclear or higher isocyanate content of 0 to 4%.

* * * * *